United States Patent [19]

Ihara

[11] Patent Number: 5,554,337
[45] Date of Patent: Sep. 10, 1996

[54] PREPARATION OF SPHERICAL BODY

[75] Inventor: Keisuke Ihara, Yokohama, Japan

[73] Assignee: Bridgestone Sports Co., Ltd., Tokyo, Japan

[21] Appl. No.: 399,463

[22] Filed: Mar. 7, 1995

[30] Foreign Application Priority Data

Mar. 7, 1994 [JP] Japan .................................. 6-062028

[51] Int. Cl.⁶ .......................... B29C 37/02; A63B 37/12
[52] U.S. Cl. ...................... 264/442; 264/161; 425/174.2; 425/806
[58] Field of Search ......................... 264/23, 161, 328.1, 264/442, 443, 445, 478; 425/174.2, 289, 806; 83/956

[56] References Cited

U.S. PATENT DOCUMENTS

| | | | |
|---|---|---|---|
| 3,595,453 | 7/1971 | Sherry | 264/23 |
| 4,518,551 | 5/1985 | Lin | 264/161 |
| 4,670,210 | 6/1987 | Boggs | 264/161 |
| 4,880,241 | 11/1989 | Melvin et al. | |
| 4,892,018 | 1/1990 | Boggs. | |
| 5,069,832 | 12/1991 | Okumura et al. | 264/161 |
| 5,318,420 | 6/1994 | Blaimschein | 264/23 |
| 5,407,341 | 4/1995 | Endo et al. | 425/577 |

*Primary Examiner*—Jill L. Heitbrink
*Attorney, Agent, or Firm*—Sughrue, Mion, Zinn, Macpeak & Seas

[57] ABSTRACT

A spherical body having at least a surface portion made of a thermoplastic resin, typically golf ball is prepared by molding the resin in a split mold consisting of a pair of mold halves. The spherical body as molded has a ring-shaped fin on its surface along the parting line between the mold halves. The fin is removed from the spherical body surface by means of a ultrasonic cutter. The method can remove only the fin at the parting line while minimizing any damage to the proximity of the fin and resurfacing the deburred area as smooth as possible. The method is suited for the manufacture of golf balls and golf ball cores.

6 Claims, 2 Drawing Sheets

PREPARATION OF SPHERICAL BODY

BACKGROUND OF THE INVENTION

1. Field of the Invention

This invention relates to a method for preparing a spherical body, typically golf ball using a split mold. More particularly, it relates to a method for preparing a spherical body wherein a fin that is formed on the spherical body surface along the split mold mating line can be effectively removed.

2. Prior Art

A split mold is often used in the molding of a spherical body such as a golf ball. FIG. 5 schematically illustrates a split mold A consisting of a pair of upper and lower mold halves A1 and A2 which are mated along a parting line C to define a cavity B. After a molding resin is placed in the cavity B, thec mold halves A1 and A2 are tightly closed to mold the resin into a spherical body. At the region of the spherical body thus molded that corresponds to the parting line C of the split mold A, the resin spreads over the parting line C to leave a ring-like fin or burr 2 as shown in FIG. 4. The fin 2 must be removed before the spherical body can be commercially acceptable.

A variety of deburring techniques are known in the art for removing the annular fin from the spherical body. Typical deburring techniques include a grinding technique of abrading off the fin with an abrasive wheel or sand paper while rotating the spherical body; a technique of cutting off the fin by means of a so-called water jet cutter by injection high pressure water (see JP-A 228226/1993); and a technique of removing the fin with a laser beam.

However, the technique using an abrasive wheel or sand paper and a technique using a heat iron have the problem that in deburring the spherical body is machined or melted to an extra region disposed adjacent the fin. In the case of a golf ball, dimples disposed adjacent the fin are adversely affected, detracting from the outer appearance and performance of the golf ball. The technique using a water jet cutter has the alleged advantage that it can remove only the fin without machining adjacent regions. However, since a split mold is inevitably accompanied by a misalignment between the upper and lower mold halves, a step 3 is formed on the spherical surface across the fin 2 as shown in FIG. 4A. In order to remove the step 3, the spherical body must be machined to a relatively large area about the fin 2 to define a relatively wide deburred zone 4 as shown in FIG. 4B. In the case of a gold ball, dimples disposed adjacent the fin can be impaired. A similar problem arises with the laser beam cutting technique, which also suffers from the problem of scorching the surface of a molded piece due to laser heat.

Golf balls and other spherical bodies on which requirements of high quality are imposed need, after removal of a fin, a finishing step of melting the root of the fin to finish the deburred region into a smooth spherical shape. Since the overall process includes two steps, deburring and finishing steps, it is complex and costly to manufacture spherical bodies of quality.

SUMMARY OF THE INVENTION

Therefore, an object of the present invention is to provide a method for preparing a spherical body which can remove only a ring-shaped fin while minimizing any damage to the proximity of the fin, can smooth a step which is formed on a spherical body surface as a result of a misalignment between upper and lower mold halves, and can concurrently carry out fin-removing and finishing steps.

According to the present invention, a spherical body having at least a surface portion made of a thermoplastic resin is molded in a split mold consisting of a pair of mold halves mated along a parting line. The spherical body as molded has a fin on its surface along the parting line. Then the fin is removed from the spherical body surface by means of a ultrasonic cutter. The spherical body is typically a golf ball or gold ball core.

The ultrasonic cutter includes a transducer section and a welder section in the form of a cutter knife which is placed in contact with a fin on a spherical body. The transducer section transduces electric energy into ultrasonic vibration, which is transferred to the welder to vibrate the welder. Vibration of the welder generates frictional heat between the welder and the fin, by which the fin of thermoplastic resin is melted and cut.

Like conventional cutters, the ultrasonic cutter can remove only a fin. Where a step is formed at the root of the fin or fin residues are left, with the advance of the cutter along the spherical body surface, the heat generated by the cutter causes any protruding material at the step to flow and fill in a nearby recess to smooth the area. As compared with the mere machining for smoothing, the spherical body is worked over a narrower region. Since the fin can be removed while smoothing the step, the present invention can carry out fin removal and finishing at the same time. That is, fin removal is completed in a single stage.

DESCRIPTION OF PREFERRED EMBODIMENT

Figure 5:
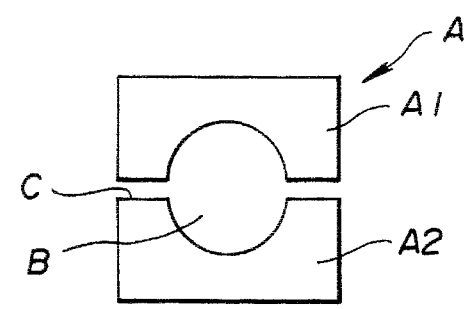
FIG. 5 is a schematic cross-sectional view of a split mold.

One embodiment of the present invention is described with reference to the figures. In the method of preparing a spherical body according to the invention, a spherical body 1 is prepared using a split mold A as used in the prior art and shown in FIG. 5. At least a surface portion (more specifically a spherical surface layer) of the spherical body is made of a thermoplastic resin, typically ionomer resin. In molding the spherical body in the split mold A, the resin spreads radially outward over the parting line C. A ring-like fin or burr 2 is left on the spherical body 1 along the parting line C. The fin 2 is removed by means of a ultrasonic cutter 10 as shown in FIG. 1.

The ultrasonic cutter 10 includes a ultrasonic oscillator 13, a hone 11 coupled therewith, and a welder 12 in the form of a cutter knife attached to the end of the hone 11. The oscillator 13 generates ultrasonic vibration which is transferred to the hone 11 and then to the welder 12. Preferred conditions include a power of 100 to 3,000 W and a ultrasonic frequency of 20 to 40 kHz. Such a ultrasonic cutter is commercially available as ultrasonic welder USWP-100Z28S from Ultrasonic Industry K.K.

Figure 1:
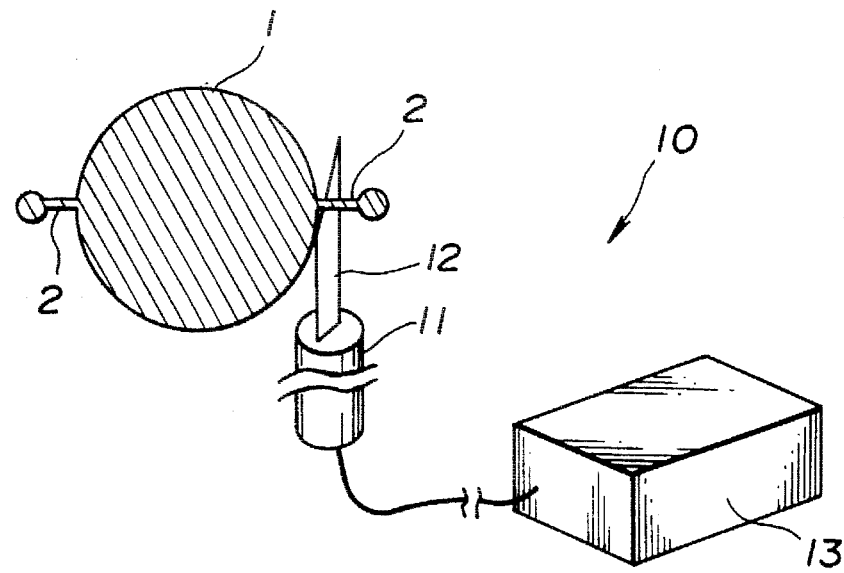
FIG. 1 is a perspective view showing how to cut a fin on a spherical body using a ultrasonic cutter according to the present invention.

The fin 2 is removed from the spherical body 1 by means of the ultrasonic cutter 10 as shown in FIG. 1. While rotating the spherical body 1 or moving the hone 11 around the spherical body 1, the cutter knife of the welder 12 of the ultrasonic cutter 10 is placed in contact with the root of the fin 2 for effecting deburring. Vibration of the welder 12 generates frictional heat between the welder 12 and the fin 2 or thermoplastic resin, by which the thermoplastic resin is melted at its region in contact with the welder 12. The fin 2 is cut off in a similar manner to conventional cutters.

Figure 2:
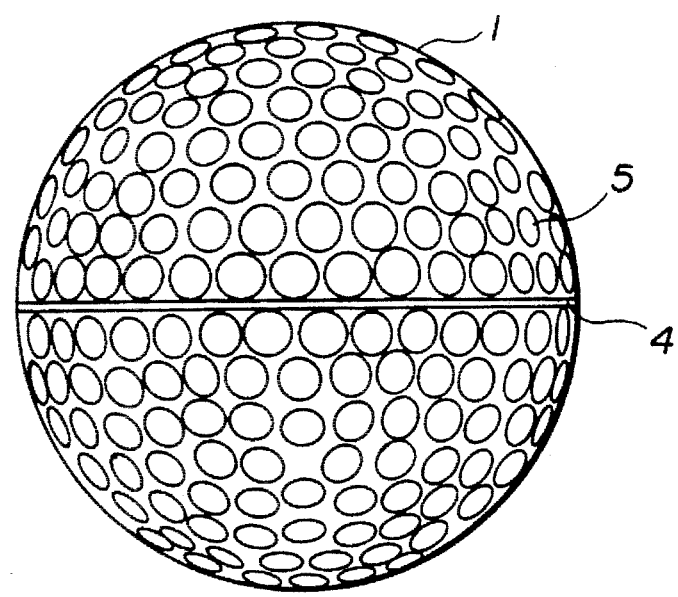
FIG. 2 is an elevational view of a golf ball produced by the inventive method.
Figure 3A:
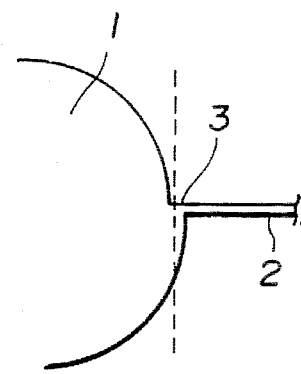
FIG. 3 is a schematic cross-sectional view showing how to cut a fin from a spherical body and process a step thereon by the inventive method.
Figure 3B:
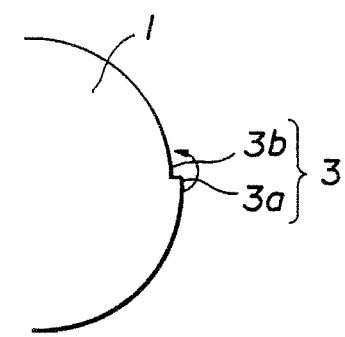
Figure 4A:
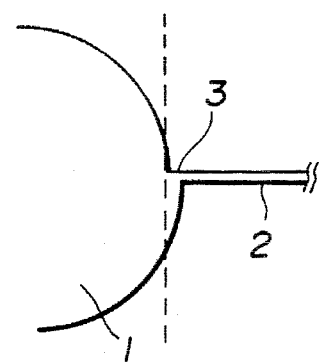
FIG. 4 is a schematic cross-sectional view showing how to cut a fin from a spherical body and process a step thereon by a prior art method.
Figure 4B:
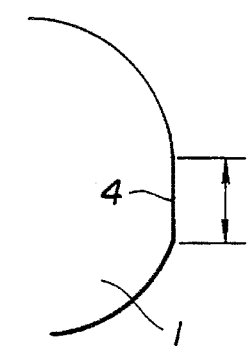

In some cases, a step 3 is formed on the surface of the molded spherical body at the parting line due to a misalignment between the upper and lower mold halves as shown in FIG. 3A. After the fin 2 is cut along broken lines in FIG. 3A, a step 3 including a raised portion 3a and a depressed portion 3b is left behind as shown in FIG. 3B. Since the ultrasonic cutter 10 cuts the fin 2 by heat, the material of the raised portion 3a is melted and flows to the depressed portion 3b. In this way the step 3 is flattened or resurfaced as if a heat iron is used. Accordingly, the inventive method can smooth the spherical body surface near the fin root at the same time as fin removal. The invention does not require two steps of fin removal and finishing as needed in the prior art, but a single step for both fin removal and finishing. The area of fin removal can be a minimum area necessary to remove or cut the fin because only the fin is cut as is cut by a conventional cutter knife and because the material of the raised portion 3a of the step 3 is carried to the depressed portion 3b. As a result, the area of fin removal is a very narrow band as shown at 4 in FIG. 2.

Where a golf ball has dimples 5 disposed adjacent the fin removed band 4 as shown in FIG. 2, the inventive method can minimize the influence of ultrasonic melting on the adjacent dimples 5. Then the inventive method is advantageously applicable to the manufacture of golf balls having improved outer appearance and flying performance.

EXAMPLE

Using a split mold consisting of a pair of upper and lower mold halves, an ionomer rein was molded over a wound golf ball core to form a cover thereon. The molded balls had a ring-shaped fin which was about 10 to 100 µm thick near the ball surface and a step of about 10 to 200 µm in height.

Using a ultrasonic plastic welder (100 W, 28 kHz, oscillator: BLT type PZT, manufactured by Ultrasonic Industry K.K.) having a hone equipped with a cutter knife, the fin was cut.

The cut area on the golf ball surface had an average width of about 30 to 150 µm, which had no influence on adjacent dimples. The step disappeared. The parting line on the surface of the ball was smooth.

For comparison purposes, golf balls molded as above to have a fin was deburred using a round file or a cutter knife. The cut area of the golf ball surface had an average width of about 100 to 1,000 µm, and adjacent dimples were partially scraped.

There has been described a method for preparing a spherical body by molding a thermoplastic resin in a split mold which can remove only a ring-shaped fin at the parting line while minimizing any damage to the proximity of the fin and resurfacing the deburred area as smooth as possible. The method is suited for the manufacture of golf balls and golf ball cores.

Although some preferred embodiments have been described, many modifications and variations may be made thereto in the light of the above teachings. It is therefore to be understood that within the scope of the appended claims, the invention may be practiced otherwise than as specifically described.

I claim:

1. A method for preparing a spherical body, comprising the steps of:

molding a spherical body having at least a surface portion made of a thermoplastic resin in a split mold consisting of a pair of mold halves mated along a parting line, the spherical body as molded having a fin on its surface along the parting line, and removing the fin from the spherical body surface by heat by means of an ultrasonic cutter while melting and flowing a raised portion of a step at said parting line into a depressed portion thereby flattening said step.

2. The method of claim 1 wherein the spherical body is a golf ball.

3. The method of claim 1 wherein the spherical body is a golf ball core.

4. The method of claim 2 wherein a cut surface of the surface of said golf ball has an average width of about 30 to 150 µm without influence on adjacent dimples.

5. The method of claim 1 wherein said step of removing by means of an ultrasonic cutter comprises the steps of generating ultrasonic vibration in a power range of 100 to 3,000 W and an ultrasonic frequency of 20 to 40 KHz.

6. The method of claim 1 wherein step of removing is carried out by relative movement between said spherical body and said ultrasonic cutter with said cutter placed in contact with a root of said fin.

\* \* \* \* \*